US011470036B2

(12) United States Patent
Ramanathan et al.

(10) Patent No.: US 11,470,036 B2
(45) Date of Patent: Oct. 11, 2022

(54) EMAIL ASSISTANT FOR EFFICIENTLY MANAGING EMAILS

(71) Applicant: Microsoft Technology Licensing, LLC, Redmond, WA (US)

(72) Inventors: Rajesh Ramanathan, Redmond, WA (US); James Edelen, Kirkland, WA (US); Britta Burlin, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 940 days.

(21) Appl. No.: 13/804,914

(22) Filed: Mar. 14, 2013

(65) Prior Publication Data
US 2014/0280616 A1    Sep. 18, 2014

(51) Int. Cl.
*H04L 51/42* (2022.01)
*G06Q 10/10* (2012.01)
*H04L 51/212* (2022.01)

(52) U.S. Cl.
CPC ........... *H04L 51/42* (2022.05); *G06Q 10/107* (2013.01); *H04L 51/212* (2022.05)

(58) Field of Classification Search
CPC ....... G06Q 10/107; H04L 51/12; H04L 51/22; H04L 67/306; H04L 29/06; G06F 16/248; G06F 11/3438; G06F 11/3476
See application file for complete search history.

(56) References Cited

U.S. PATENT DOCUMENTS

| 6,725,228 B1 * | 4/2004 | Clark ................... G06Q 10/107 |
| 7,007,067 B1 * | 2/2006 | Azvine ................... G06F 3/011 |
| | | 709/202 |
| 7,089,241 B1 | 8/2006 | Alspector et al. |

(Continued)

FOREIGN PATENT DOCUMENTS

| CN | 102576434 A | 7/2012 | |
| FR | 2830642 A1 * | 4/2003 | ............. G06F 17/30 |
| WO | 0026827 A1 | 5/2000 | |

OTHER PUBLICATIONS

Michael Fleming and Robin Cohen. "User Modeling in the Design of Interactive Interface Agents." Proceedings of the seventh international conference of CISM International Centre for Mechanical Sciences, vol. 407, UM99: User Modeling, Jun. 20-24, 1999, pp. 67-76.*

(Continued)

*Primary Examiner* — Hitesh Patel

(57) ABSTRACT

Technologies are generally described for providing an email assistant for sorting through emails received at an email application. The email assistant may prioritize emails and group high and low priority emails separately to enable a user to quickly view and manage an email inbox. The email assistant may also provide suggestions on how to sort and manage emails in the inbox of the email application. The email assistant may observe a user's pattern of interactions with types of emails, and prioritize emails and suggest actions based on the user's interactions. The email assistant may be configured to automatically sort emails and provide management suggestions based on a detected scenario such as a user's return after a period of time away, a large influx of emails, and presence detection.

18 Claims, 10 Drawing Sheets

(56) References Cited

U.S. PATENT DOCUMENTS

| | | | |
|---|---|---|---|
| 7,725,544 | B2 | 5/2010 | Alspector et al. |
| 7,961,853 | B2* | 6/2011 | Voticky ................ G06Q 10/107 |
| | | | 709/207 |
| 8,166,392 | B2 | 4/2012 | Horvitz |
| 8,572,184 | B1 | 10/2013 | Cosoi |
| 8,631,080 | B2 | 1/2014 | Goodman et al. |
| 8,745,045 | B2 | 6/2014 | Bawri et al. |
| 8,935,190 | B2* | 1/2015 | Amoroso ............ G06Q 10/107 |
| | | | 706/46 |
| 8,935,768 | B1 | 1/2015 | Tyree |
| 9,942,184 | B2 | 4/2018 | Gaines et al. |
| 9,953,161 | B2 | 4/2018 | Ding et al. |
| 10,963,842 | B1* | 3/2021 | Resheff ................ G06F 16/906 |
| 2005/0004989 | A1* | 1/2005 | Satterfield et al. .......... 709/206 |
| 2006/0010217 | A1 | 1/2006 | Sood |
| 2006/0075044 | A1* | 4/2006 | Fox ..................... G06Q 10/107 |
| | | | 709/206 |
| 2006/0248184 | A1 | 11/2006 | Wu et al. |
| 2007/0011258 | A1* | 1/2007 | Khoo .................... G06F 3/0482 |
| | | | 709/206 |
| 2007/0036301 | A1* | 2/2007 | Voticky ................ G06Q 10/107 |
| | | | 379/88.22 |
| 2007/0061400 | A1 | 3/2007 | Parsons |
| 2007/0203997 | A1 | 8/2007 | Ingerman et al. |
| 2008/0126951 | A1* | 5/2008 | Sood ........................ H04L 51/26 |
| | | | 715/752 |
| 2009/0006366 | A1 | 1/2009 | Johnson et al. |
| 2009/0125528 | A1 | 5/2009 | Choi |
| 2009/0327430 | A1 | 12/2009 | Colvin et al. |
| 2010/0017476 | A1 | 1/2010 | Shue |
| 2010/0057870 | A1 | 3/2010 | Ahn et al. |
| 2010/0082749 | A1 | 4/2010 | Wei et al. |
| 2010/0153325 | A1* | 6/2010 | Amoroso ............ G06Q 10/107 |
| | | | 706/46 |
| 2010/0179961 | A1 | 7/2010 | Berry et al. |
| 2010/0205259 | A1 | 8/2010 | Vitaldevara et al. |
| 2010/0211644 | A1* | 8/2010 | Lavoie ................. G06Q 10/107 |
| | | | 709/206 |
| 2010/0229246 | A1 | 9/2010 | Warrington et al. |
| 2010/0325629 | A1* | 12/2010 | Fujioka ................. G06F 3/0481 |
| | | | 718/1 |
| 2010/0332428 | A1 | 12/2010 | McHenry et al. |
| 2011/0035451 | A1 | 2/2011 | Smith et al. |
| 2011/0047228 | A1* | 2/2011 | Balasaygun ............ G06F 9/543 |
| | | | 709/206 |
| 2011/0153646 | A1 | 6/2011 | Hong et al. |
| 2012/0143806 | A1 | 6/2012 | Sundelin et al. |
| 2012/0143931 | A1 | 6/2012 | Rosenberger et al. |
| 2012/0149405 | A1* | 6/2012 | Bhat .............................. 455/466 |
| 2012/0150772 | A1 | 6/2012 | Paek et al. |
| 2012/0151380 | A1 | 6/2012 | Bishop |
| 2012/0215866 | A1 | 8/2012 | Satterfield et al. |
| 2012/0290662 | A1 | 11/2012 | Weber |
| 2013/0111341 | A1 | 5/2013 | Bier et al. |
| 2013/0179516 | A1 | 7/2013 | Tsai et al. |
| 2014/0280616 | A1* | 9/2014 | Ramanathan ........... H04L 51/22 |
| | | | 709/206 |
| 2015/0188870 | A1 | 7/2015 | Sharp et al. |
| 2016/0140222 | A1 | 5/2016 | Thapliyal et al. |
| 2016/0262128 | A1 | 9/2016 | Hailpern et al. |
| 2017/0032320 | A1 | 2/2017 | Huang et al. |

OTHER PUBLICATIONS

Author unknown. "Xiant Filer User Guide." Published by Vulcan Technologies LLC dba Xiant. Jun. 11, 2009. 12 pages. Available online: https://web.archive.org/web/20090704151017/http://www.xiant.com/filer/XiantFilerUserGuide.pdf.*

Pattie Maes. "Agents that Reduce Work and Information Overload." Communications of the ACM 37, No. 7, 1994 (month unknown): pp. 30-40.*

Free Email Tutorials. "Empty a Folder in Yahoo Mail". 3 pages. Archived Mar. 2, 2012. Available online: https://web.archive.org/web/20120302061524/http://www.freeemailtutorials.com/yahooMailTutorials/emptyTrashSpamAndOtherEmailFolders.php.*

Author unknown. "SpamAssassin as a Learning System." 12 pages. Archived Feb. 29, 2012. Available online: https://web.archive.org/web/20120229163852/http://commons.oreilly.com/wiki/index.php/SpamAssassin/SpamAssassin_as_a_Learning_System.*

Machine translation of Description portion of FR 2830642. Translated Jun. 4, 2015. 22 Pages. Available online: http://translationportal.epo.org/emtp/translate?ACTION=description-retrieval&COUNTRY=FR&ENGINE=google&FORMAT=docdb&KIND=A1&LOCALE=en_EP&NUMBER=2830642&OPS=ops.epo.org/3.1&SRCLANG=fr&TRGLANG=en&PDF=true&PDFboth=true.*

"Toolbar". Feb. 16, 2012 revision. Wikipedia. 2 pages. Available online: https://en.wikipedia.org/w/index.php?title=Toolbar&oldid=477231824.*

"Scrollbar". Jan. 16, 2012 revision. Wikipedia. 4 pages. Available online: https://en.wikipedia.org/w/index.php?title=Scrollbar&oldid=471607303.*

Julio Sanchez and Maria P. Canton. "Software Solutions for Engineers and Scientists". Chapter 22: pp. 549-595. CRC Press, Oct. 2007.*

Doug Aberdeen. "Official Gmail Blog: Email overload? Try Priority Inbox". Aug. 30, 2010. 3 pages. Available online: http://gmailblog.blogspot.com/2010/08/email-overload-try-priority-inbox.html.*

ClearContext Corporation. "ClearContext Inbox Manager™ for Microsoft Outlook®: Designing a More Effective Inbox". Mar. 2004. 4 pages.*

Tsugawa, et al., "Robust Estimation of Message Importance using Inferred Inter-Recipient Trust for Supporting Email Triage", Retrieved at <<http://ieeexplore.ieee.org/stamp/stamp.jsp?tp=&arnumber=5598148>>, In 10th IEEE/IPSJ International Symposium on Applications and the Internet, Jul. 19, 2010, pp. 4.

Schumacher, Frederick W., "Email Visualization Strategies to Support Task Management", Retrieved at <<http://dtpr.lib.athabascau.ca/action/download.php?filename=scis-07/open/schumacher_comp696_final.pdf>>, An Essay Submitted in Partial Fulfillment of the Requirements for the Degree of Master of Science in Information Systems, Nov. 2007, pp. 52.

Forsyth, et al., "Strategies to Reduce Email Overload", Retrieved at <<http://www.ipcsit.com/vol2/20-A202.pdf>>, In International Conference on Computer Engineering and Applications, Jun. 6, 2009, pp. 7.

Neustaedter, et al., "The Social Network and Relationship Finder: Social Sorting for Email Triage", Retrieved at <<http://www.connectedaction.net/wp-content/uploads/2011/01/2005%20-%20CEAS%20-%20SNARF%20-%20Social%20Sorting.pdf>>, In Conference on E-mail and Anti-Spam, Jul. 2005, pp. 8.

"International Search Report & Written Opinion for PCT Patent Application No. PCT/US2014/021455", dated Sep. 25, 2014, 10 Pages.

"Supplemental Search Report Issued in European Patent Application No. 14713703.8", dated Oct. 26, 2016, 8 Pages.

"Alerts and Overviews for Newly Received Emails", Retrieved from: <<https://www.msoutlook.info/question/alerts-and-overviews-for-new-emails>>, Dec. 15, 2015, 3 Pages.

"Non Final Office Action Issued in U.S. Appl. No. 15/421,039", dated Oct. 10, 2018, 36 Pages.

"Office Action Issued in Chinese Patent Application No. 201480015204.0", dated Jun. 5, 2018, 12 Pages.

"First Office Action Issued in Chinese Patent Application No. 201480015204.0" dated Jun. 5, 2018, 12 Pages.

"Office Action Issued in European Patent Application No. 14713703.8", dated Sep. 26, 2017, 5 Pages.

"Final Office Action Issued in U.S. Appl. No. 15/421,039", dated Apr. 18, 2019, 43 Pages.

"Non Final Office Action Issued in U.S. Appl. No. 15/421,039", dated Aug. 30, 2019, 49 Pages.

"Notice of Allowance Issued in U.S. Appl. No. 15/421,039", dated Jan. 23, 2020, 11 Pages.

(56) References Cited

OTHER PUBLICATIONS

"Second Office Action Issued in Chinese Patent Application No. 201480015204.0", dated Feb. 22, 2019, 20 Pages.

* cited by examiner

EMAIL ASSISTANT FOR EFFICIENTLY MANAGING EMAILS

BACKGROUND

Email applications are widely used by users on a variety of client devices for non-real time correspondence. With the proliferation of computing and networking technologies, email use has become an inextricable part of daily personal and professional lives. The increased reliance on email brings with it the disadvantage of how to deal with increasingly large numbers of emails. It is a common occurrence to find hundreds of email needing attention (at least a quick review) when a person comes back from vacation or comparable absence. Similarly, certain events (e.g., a product release, a conference, etc.) may generate a large number of received emails when the person receiving the emails may be too busy to deal with the increased volume.

Some emails may be important to a user as they may be related to work and personal matters, while other emails may be fairly unimportant such as recreational and entertainment emails, or sent simply as a courtesy copy. Users may receive a large quantity of emails hourly and daily, and sorting through hundreds and even thousands of emails to find important emails that need to be dealt with can be arduous, inefficient, and time consuming. Additionally, viewing and sorting through such a large quantity of emails may be even more difficult when the user employs a smaller user interface client device such as a mobile device or tablet to view and manage emails.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to an email assistant for managing emails as they arrive at an email application. The email assistant may organize high and low priority emails in separate groups for enabling a user to quickly view important emails. The email assistant may also enable bulk actions, such as a delete, on a low priority group of emails. The email assistant may provide suggestions on how to sort and manage emails in the inbox of the email application. The email assistant may further observe a user's interactions with emails, and prioritize the emails, suggest actions, or even perform automatic actions based on the user's interactions. The email assistant may be configured to automatically sort emails and to provide suggestions based on a detected scenario such as a user's return after a period of time away, a large influx of emails, and presence detection. The email assistant may also provide different viewing suggestions and sorting based on a client device used for viewing the emails.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
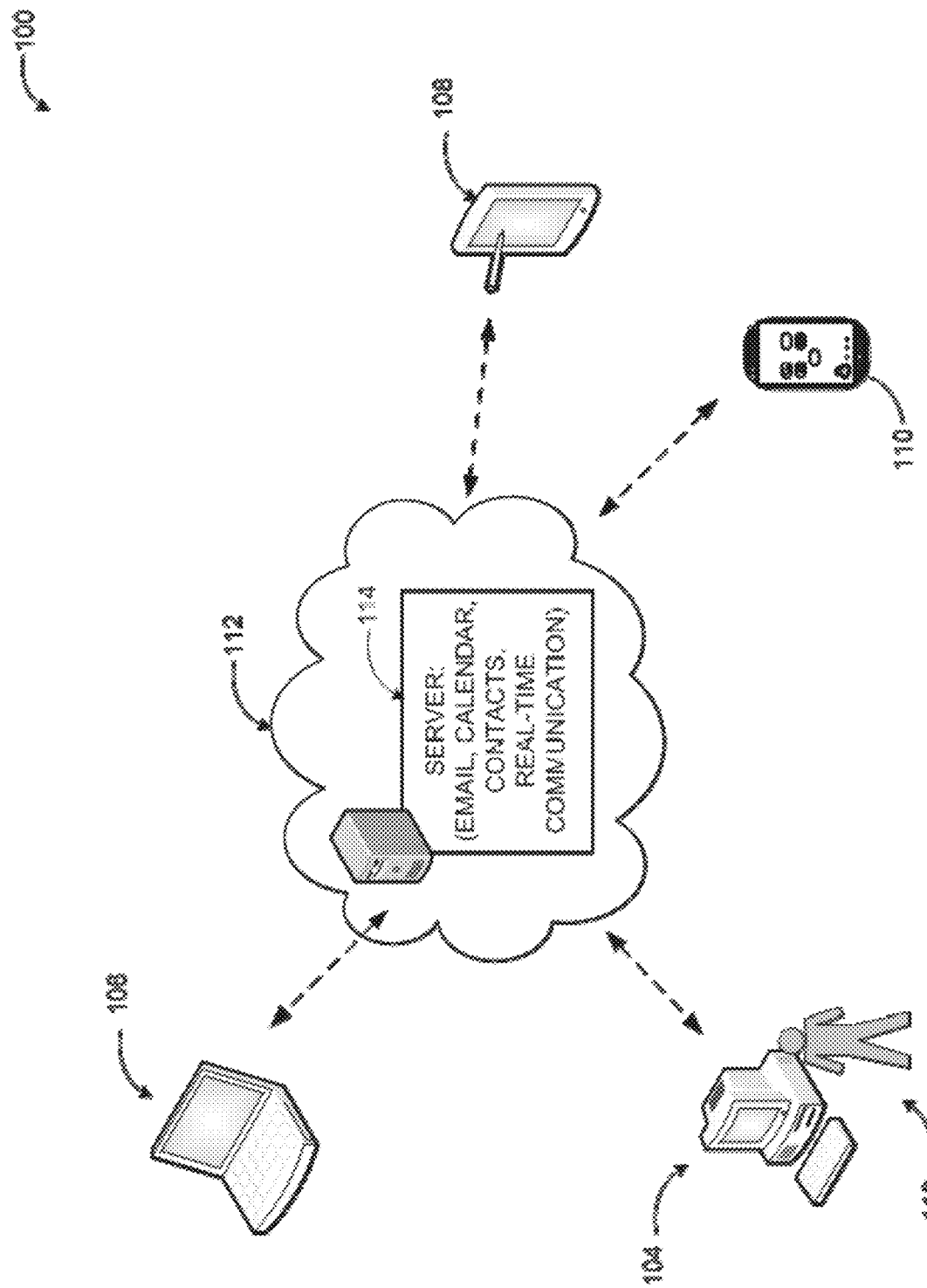
FIG. 1 illustrates an example collaborative environment where an email assistant on a client device may be employed.

As briefly described above, an email assistant is provided for managing emails in an inbox at an email application. The email assistant may prioritize emails in separate high and low priority groups for enabling a user to quickly view important emails. The email assistant may provide a suggestion pane for providing suggestions on how to sort and manage emails in the inbox of the email application.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing an email assistant for sorting and managing emails in an email application. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

According to embodiments, a client device may be a touch or gesture-enabled device, such that hand gestures and finger touch may be recognized as input methods on the user interface of the client device for interacting with, controlling, and providing content to the client device. The client device may also work with a traditional mouse and keyboard. A touch or gesture-enabled device may recognize touch actions such as a tap, swipe, pinch, expand, and drag, as some examples. Touch actions, such a tap, swipe, pinch, expand, and drag, and other similar actions as used herein may be provided by a user through a finger, a pen, a mouse, or similar device, as well as through predefined keyboard entry combinations, a voice command, or an eye-tracking input.

FIG. 1 illustrates an example collaborative environment where an email assistant on a client device may be employed. In a collaborative environment, as demonstrated in diagram 100, a user 116 may employ a variety of different client devices to receive emails at an email application executed on the client devices. The email application may be executed on the client device and the email application may be connected with a server 114 and with other client devices over a network 112, which may be a wired or wireless network, or a cloud network. The server 114 providing the emails may provide other features accessible at the client devices over the network such as calendar applications, word processing applications, contacts management, and real-time communications platforms, such as instant messaging, audio/visual conferencing, and presence detection.

Some example client devices for viewing emails may include as a desktop computing device 104, a personal computer 106, a tablet 108, a smartphone 110, a whiteboard and other similar client devices. The client devices may be configured to enable touch and gesture interaction, such that the user 116 may interact with a document, or an email, viewed on the user's client device employing touch and gesture actions on the user interface of the client device.

In some example embodiments, an email application may be configured to display emails in different configurations based on the type of computing device for optimizing how a user views and interacts with emails on the computing device. For example, a personal computer or desktop device may have more viewing space on the user interface such that a larger quantity of emails may be viewed at a time, as well as some detailed preview information about an email may be provided. A tablet or smartphone, however, may have a smaller user interface and thus more limited viewing space for displaying emails. As a result of a smaller user interface, fewer emails and a more limited preview version of the emails may be displayed on an email application executed on a smart phone or tablet.

Often times, a user may be enabled to receive a large quantity of emails daily at an email application. Example emails may include important business and personal emails, as well as less important emails which may include shopping, news, entertainment, recreational, and other low importance emails. When the user 116 receives a large quantity of emails, the user 116 may need to be able to quickly sort through the user's inbox to quickly find, view, and reply to important emails. Even more so, when the user 116 views emails on a tablet or smartphone, it may be even more difficult to parse through a large quantity of unread and unsorted emails quickly and efficiently.

An example email assistant, according to some embodiments, may be provided to automatically sort incoming emails, prioritize emails as high importance and low importance, and the email assistant may provide suggestions to the user 116 on some possible actions which may be taken to deal with a single email message or a group of email messages. The email assistant may be configured to analyze the user's 116 interactions with emails, and may sort the emails and provide suggestions based on the analyzed interactions. Additionally, the email assistant may be configured to activate at certain times when it may be useful, such as when a user returns from a period of time away and has a large quantity of unread emails, and in response to a large influx of emails, as some examples.

Figure 2A:
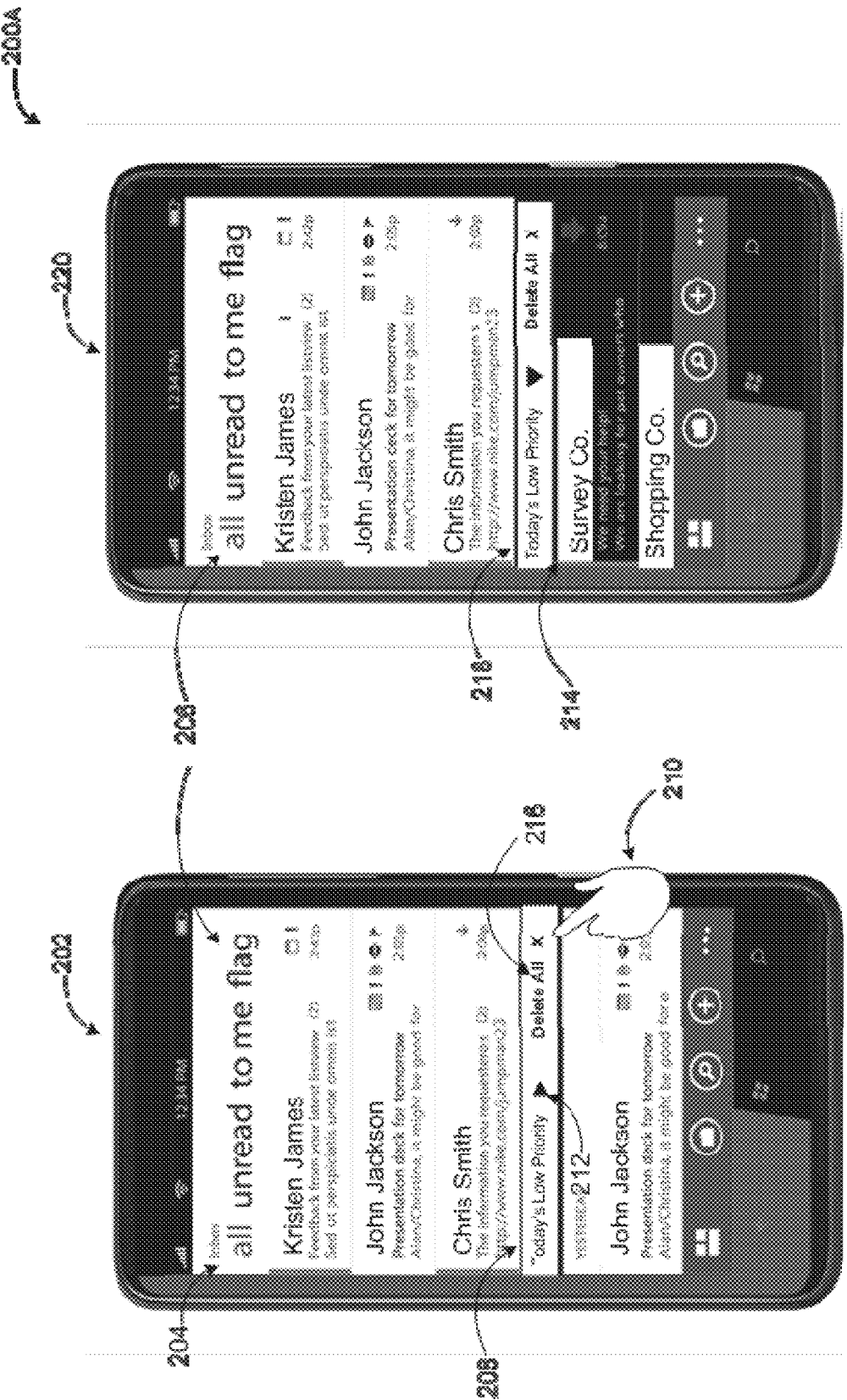
FIGS. 2A and 2B illustrate example screenshots of automatically sorting emails by priority on various client devices.
Figure 2B:
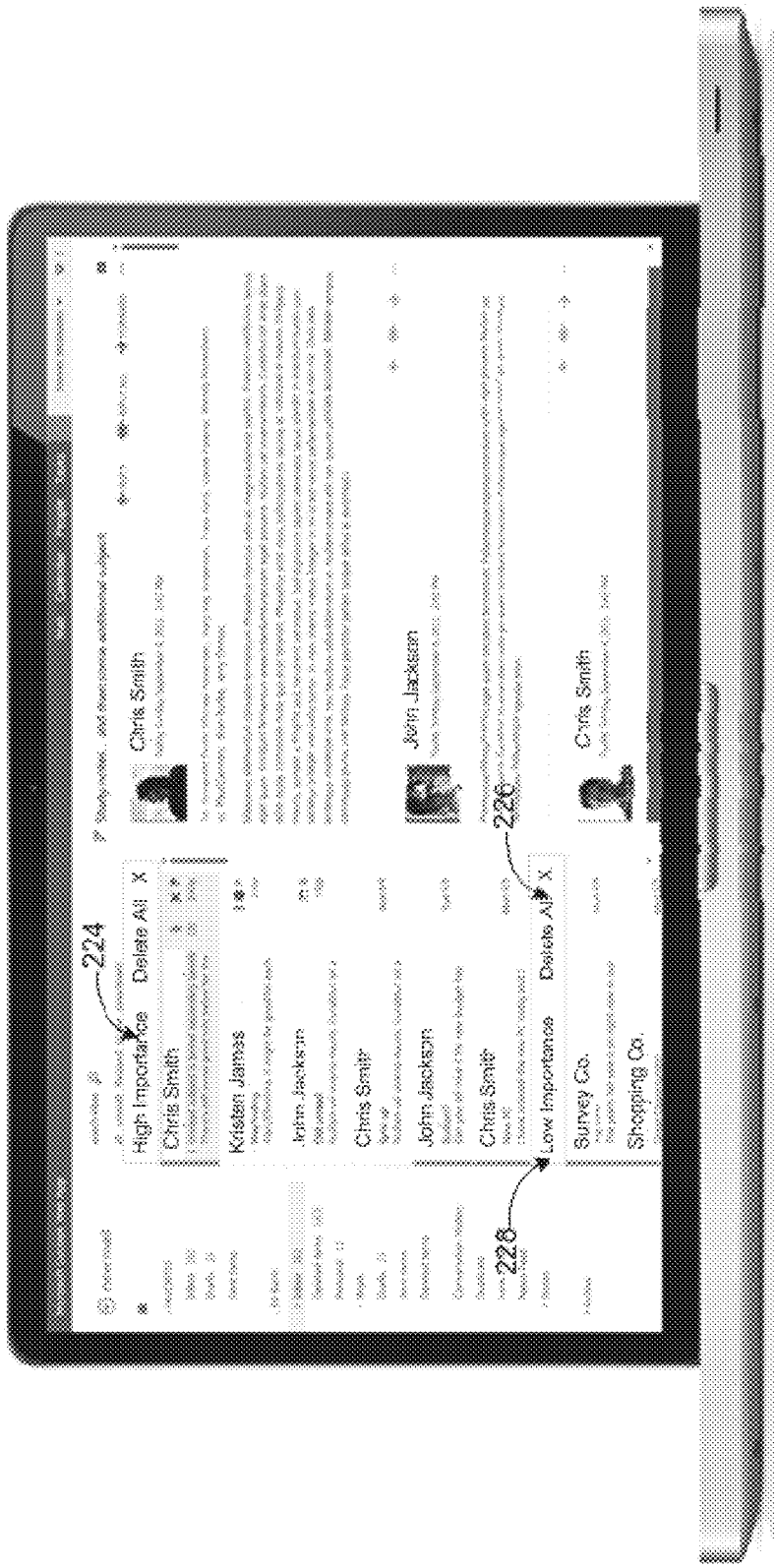

FIGS. 2A and 2B illustrate example screenshots of automatically sorting emails by priority on various client devices, according to some embodiments. As demonstrated in diagram 200A, an email assistant, according to some examples, may be executed in association with an email application executed or accessed on a user's client device 202. An example email application user interface may display inn an inbox 204 a list of received emails. An example inbox view may be an "all" view in which the inbox may display all received emails, including read and unread emails, work, personal, and recreational emails. Typically, the user may be enabled to sort the displayed emails in the inbox 204 according to a variety of schemes, including by date, by sender, by subject, alphabetically, read/unread, whether it has been flagged, and other similar sorting schemes. Some example sorting schemes may be displayed on a menu toolbar 206, for example.

In an example embodiment, an email assistant may be configured to sort emails by priority such that the inbox 204 may display high priority emails and low priority emails separately to enable the user to quickly view important emails, and to separately manage less important emails. The email assistant may prioritize emails based on observed behavior, interactions, and patterns of the user. For example, the email assistant may keep track of emails that the user flags, saves, and replies to, including information associated with the emails such as an identity of a sender, a subject, a domain name of the sender, and other similar information. The email assistant may determine that emails that the user flags, saves to certain folders, and/or replies to may be a high priority to the user. When new emails are received, the email assistant may identify new incoming and unread emails that share one or more common high priority characteristics and may designate the incoming emails as high priority. Similarly, the email assistant may identify certain types of emails as low priority based on the user's interactions with the emails, such as the user ignoring, deleting and delaying response to the emails, for example. The email assistant may identify new incoming emails that have one or more identified low priority characteristics as low priority.

In another example embodiment, the email assistant may automatically sort high priority emails and low priority emails into separate groups, and may display the high priority group separately from the low priority group on the interface. For example, on the mobile client device 202 illustrated in diagram 200A, the email assistant may group the low priority emails together, and may display the low importance items together in a low priority section or folder 208 of the inbox. The low priority folder 208 may hide the low priority emails so that the low priority emails do not occupy valuable space on the user interface, enabling more high priority emails to be viewed on the user interface. A bulk action, such as a bulk delete action 216 may be displayed which may enable the user to select/confirm (210) the delete action 216 to delete all of the emails included in the low priority folder 208.

Additionally, the low priority folder 208 may display an expansion option 212, which upon selection may open an expanded low priority folder 218 to display a list of the low priority emails 214 included in the low priority folder 208, as demonstrated on user interface of client device 220. The user may be enabled to select to perform an action on an individual email from the expanded low priority folder 218, such as standard email actions, including read, delete, reply, forward, etc., and additionally, the user may be enabled to select to delete all of the emails listed in the expanded priority folder 208 by selecting the bulk delete action 216. Moreover, when the user views the list of the low priority emails 214 included in the low priority folder 208, the user may be enabled to identify at least one email that the user desires to be high priority. The user may be enabled to perform an action on the email to move the email to high priority. An example action may be a tap and drag to the high priority folder, a right click to display options, or selection of an option to move the email to high priority. The email assistant may update its records to designate emails similar to the moved email as high priority in the future. Furthermore, the email assistant may ask the user if the user desires to move the email to high priority only for this time, or if the user would like all emails like this to be high priority in the future.

In a further example embodiment, as demonstrated in diagram 200B, the email assistant may be configured to optimize the display on the user interface based on the type of device on which the user interacts with the email application. For example, the email assistant may similarly separate high priority emails and low priority emails and may display the grouped emails in different sections of a larger user interface 222 on a client device such as a personal computer and/or a desktop computer. The low priority emails may be displayed together in a low priority section or folder 228 on the larger user interface 222 and the high priority emails may be displayed in a high priority folder 224. Bulk actions may be available on each folder, such as a delete action 226, as previously described.

Figure 3:
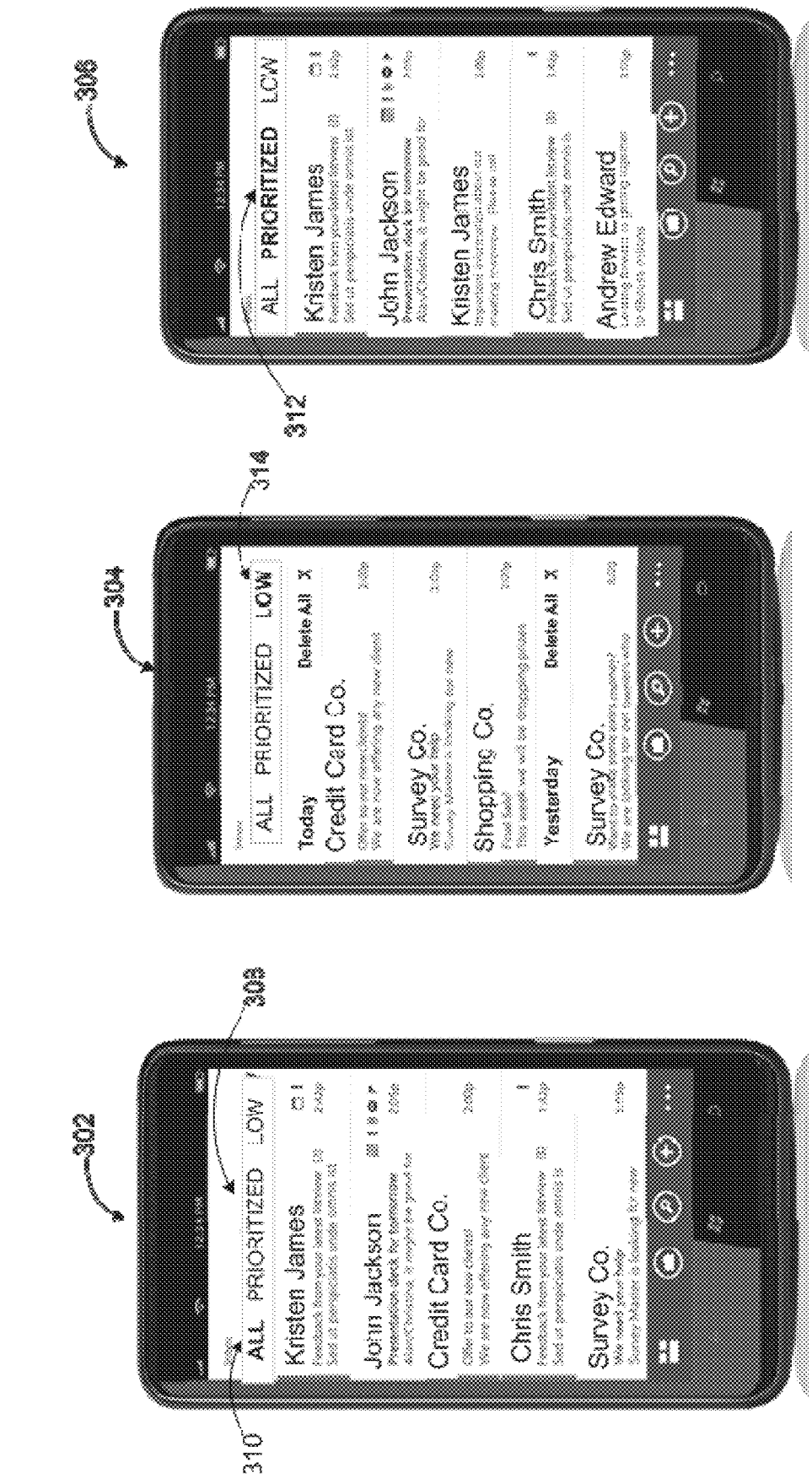
FIG. 3 illustrates an example screenshot of an email application including a toolbar displaying email viewing options.

FIG. 3 illustrates an example screenshot of an email application including a toolbar displaying email viewing options, according to some embodiments. In an example embodiment, an email assistant may be configured to sort emails by priority such that the inbox may display high priority emails and low priority emails separately to enable the user to quickly view important emails, and to separately manage less important emails. As demonstrated in diagram 300, the email assistant may display separated groups of emails on a menu toolbar 308. For example, as illustrated in user interface 304, for example, an "all" option 310 on the toolbar 308 may display all received emails, including read and unread emails, work, personal, and recreational emails, which may be sorted according to a variety of schemes or criteria.

In one embodiment, the user may be enabled to select a prioritized option on the toolbar 308. The prioritized option 312 may display a list of emails the email assistant identifies as important. The email assistant may identify emails as important based on observed actions of the user with previous emails, as previously described, such as emails that the user flags, saves to certain folders, and/or replies to. The displayed list of prioritized emails may be sorted by date, or other criteria the user selects, such as alphabetically and by sender, as some examples. The user may be enabled to select options from the toolbar employing touch actions such as a tap on an option to select it, and also the user may be enabled to swipe to navigate to different views associated with displayed options on the toolbar.

In an additional embodiment, the user may be enabled to select a low priority option 314 on the toolbar 308. The low priority option 314 may display a list of emails the email assistant identifies as low priority. The email assistant may identify emails low priority based on observed actions of the user with previous emails as previously described. Some example low priority emails the user ignored and/or previously deleted. Similar to the list of prioritized emails, the list of low priority emails may be sorted based on date, sender, alphabetically, and other sorting schemes.

Additionally, the user may be enabled to move emails from high priority to low priority and vice versa by selecting an email from the list and dragging the email to the desired option on the toolbar. For example, if the user desires to move an email from low priority to high priority, the user may be enabled to select the email and drag it to the prioritized option on the toolbar 308.

Further, low importance emails may be grouped together on the list of low priority emails based on common features such as a common sender. For example, all emails from a source that were ignored previously by the user may be grouped together in the low priority list and may be displayed as a folder of emails from the ignored source. The user may be enabled to select to expand the folder to view an expanded list of the emails included in the folder.

In another embodiment, the email assistant may automatically prioritize based on an identified category of an email. For example, personal, family, and work emails may be determined to be high priority, while entertainment, recreation, shopping, and social related emails may be determined to be low priority. The user may be enabled to specify certain categories of emails as high or low priority so that the email assistant may prioritize emails based on the user's specifications as well as based on the observed behavior and interactions.

Figure 4A:
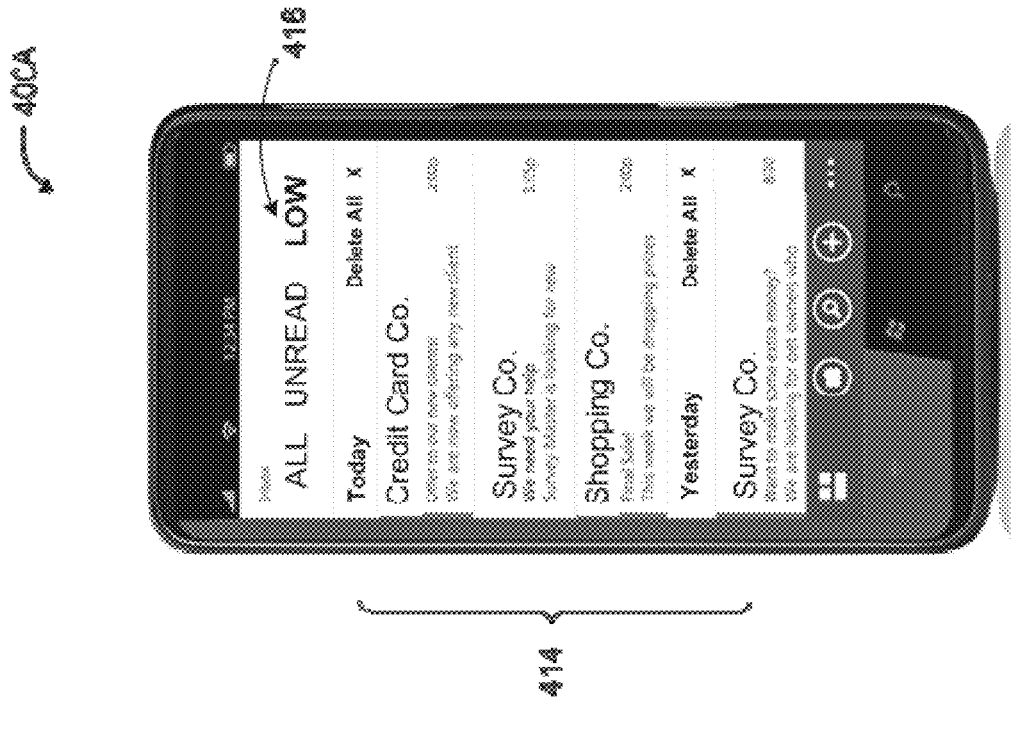
FIGS. 4A and 4B illustrate example screenshots of an email assistant displaying options for sorting, managing, and displaying emails.
Figure 4A:
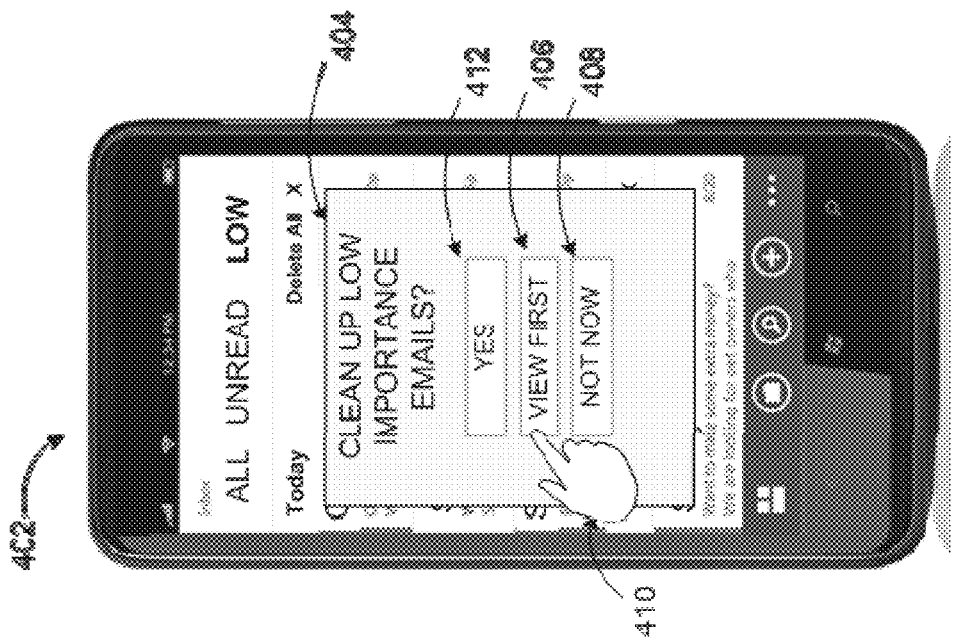
Figure 4B:
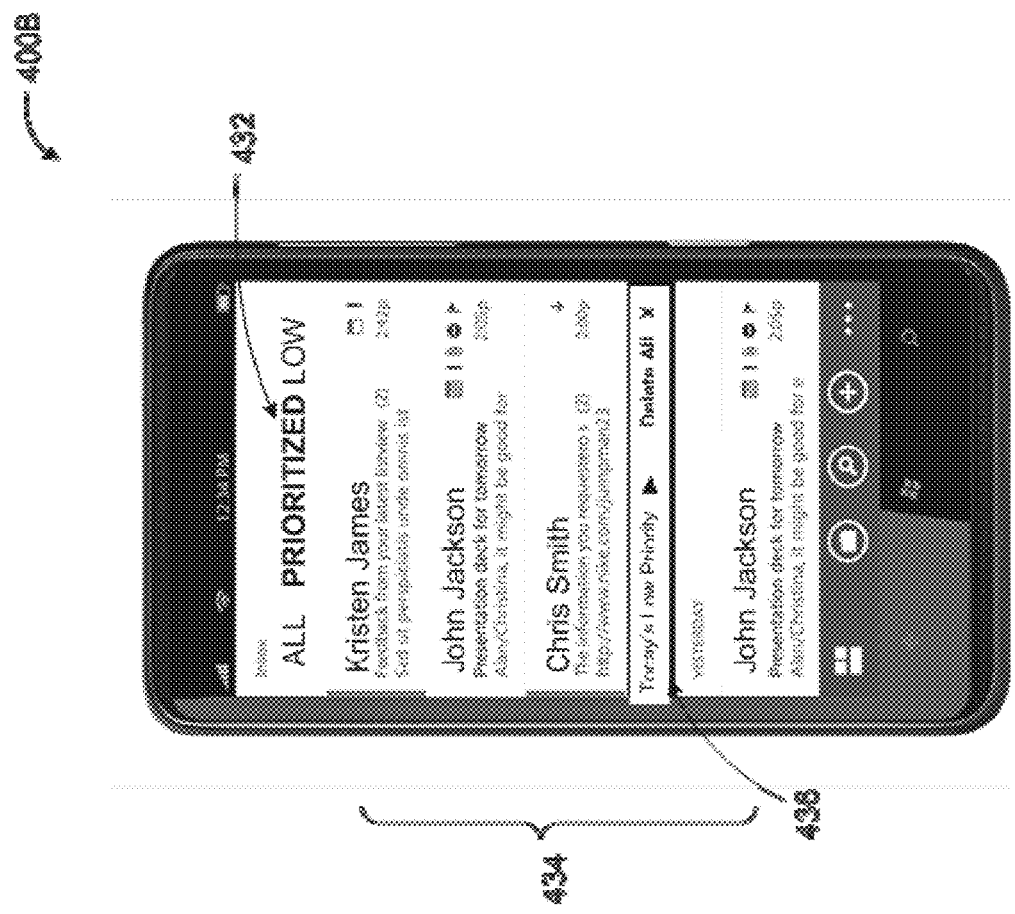
Figure 4B:
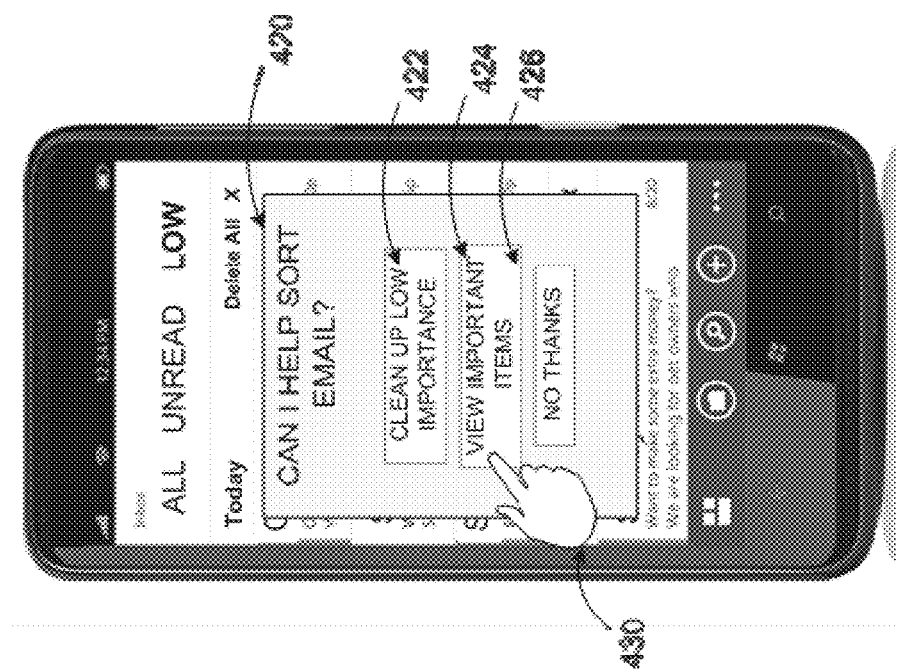

FIGS. 4A and 4B illustrate example screenshots of an email assistant displaying options for sorting, managing, and displaying emails, according to some embodiments. As demonstrated in diagram 400A, an email assistant may provide a pop up suggestion pane 404 presenting suggestions for helping user manage emails in inbox. The pop up suggestion pane 404 may be automatically displayed based on predefined trigger events, which may be situations when there may likely be a large quantity of emails for a user to manage. For example, the suggestion pane 404 may be automatically displayed when a user returns after a long period of time, such as when the user is on vacation and is likely to have a large quantity of unread emails to sort through. Similarly if the user steps away from the computer for an extended period of time, such as for lunch, errands, or a meeting, upon returning, the suggestion pane 404 may be presented to help the user sort through emails received during the time away. Further, the email assistant may be configured to present the suggestion pane 404 at specified times of the day. For example, the suggestion pane 404 may be schedule to be displayed first thing in the morning, after lunch, and at end of business day. The user may be able to customize the times when the user desires the suggestion pane to be displayed.

Additionally, the suggestion pane 404 may be configured to be automatically displayed when a large influx of emails is detected. A number of received emails which may trigger activation of the email assistant suggestion pane 404 may be predefined automatically by the email assistant and may also be customized by the user. For example, the user may be enabled to specify that if 50 emails are received within a small amount of time, such as 15 minutes, the suggestion pane 404 may be displayed to help the use sort through the received emails. In another example, the suggestion pane 404 may also be triggered based on presence. For example, the email application or other application associated with the server may detect presence of the user. For example, presence detection may include detecting when the user is idle, or inactive, and when the user becomes active or online again. When the user's status is detected as active or online, the suggestion pane 404 may be automatically presented to the user. Further, the user may be able to manually activate the suggestion pane 404 at any time the user desires. The user may be enabled to select to open the suggestion pane and the suggestion pane may present a number of options for managing and sorting through the user's inbox.

As demonstrated on device 402, when activated based on a trigger event as described above, an example suggestion pane 404 may ask if the user would like the email assistant to clean up low priority emails. The suggestion pane 404 may present a number of options for the user to select in response such as yes 412, view first 406, and not now 408. Selection 410 of the yes 412 option may perform a bulk delete action on all of the emails designated as low priority grouped together in a low priority folder. After deletion of the low priority emails, a pop up pane may be displayed to indicate successful deletion of low priority emails, and the cleaned up inbox including high priority emails may subsequently be displayed. Selection of the not now 408 option may cause the suggestion pane 404 to minimize or become hidden so that the user may be enabled to view the email application inbox to be displayed to the user. Selection of the view first 406 option may hide the suggestion pane 404 and may automatically open the low priority folder 416 to display a list of low priority emails 414 included in the low priority folder. From the list view of the low priority emails 414, the user may be enabled to interact with individual emails on the list and perform a bulk delete action on all the emails in the list as previously described.

Another example email suggestion pane 420, as illustrated in diagram 400B, may provide different suggestions for managing emails. When the suggestion pane 420 is activated, based on a trigger event or manually as previously described, the suggestion pane 420 may ask if the user would like help sorting through email. Some example suggestions may include, a clean-up low priority option 422, a view important items option 424 and a not now or no thanks option 426. Selection of the clean-up low priority option 422 may perform a bulk delete action on all of the emails designated as low priority grouped together in a low priority folder. Additionally, after deletion of the emails, a pop up pane may be displayed to indicate successful deletion of low priority emails, and the cleaned up inbox with high priority emails may subsequently be displayed. Selection of the no thanks option 426 may hide the suggestion pane 420 so the user may be enabled to view the email application inbox. Selection of the view important items option 424 may hide the suggestion pane 420 and may automatically open a high priority folder 432 to display a list of high priority emails 434 included in the high priority folder 432. The example suggestions described above are not intended to be limiting, but are examples of some actions an email assistant may suggest for a user to select. Other actions may be suggested to the user, and the described actions may be combined together and displayed in different combinations based on different scenarios.

In another example embodiment, the email assistant may detect current actions of a user as the user manually views and sorts through the inbox, and the email assistant may display a suggestion pane with suggestions relevant to the detected current action. For example, if the email assistant detects the user scanning through an inbox for emails from a particular sender to reply to, the email assistant may provide a suggestion pane to ask the user if the email assistant is to display all emails from the particular sender. Similarly, the email assistant may detect current trends when the user is viewing email such as viewing emails related to a particular topic or subject, emails which carbon copy a certain individual or groups, and other similar actions. The email assistant may provide a suggestion to the user to sort based on the detected current actions to help the user efficiently sort through the emails.

Figure 5:
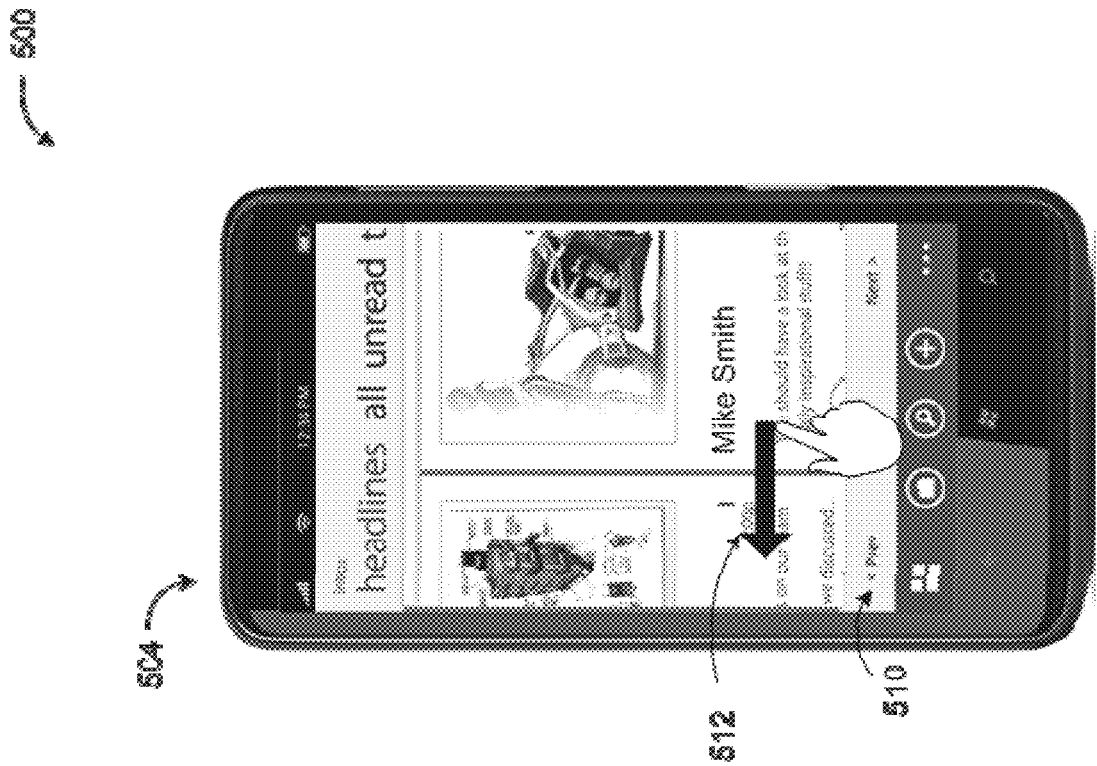
FIG. 5 illustrates an example screenshot of a headline view for viewing high importance emails on an email application.
Figure 5:
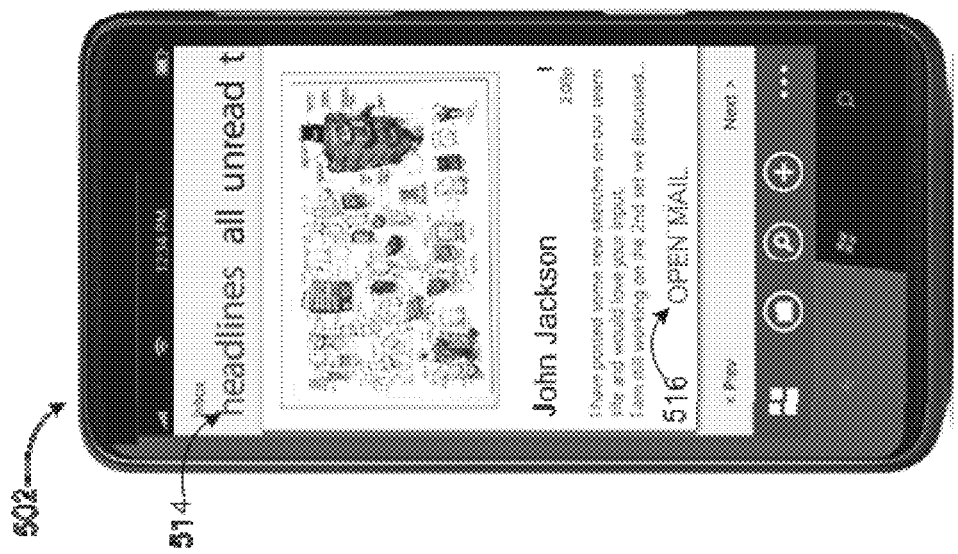

FIG. 5 illustrates an example screenshot of a headline view for viewing high priority emails on an email application, according to some embodiments. As demonstrated in diagram 500, the email assistant may display a headline view of high priority items for providing a more detailed preview of high priority emails to the user. A headline view may be an option presented on a toolbar of the email application interface. When the headline view is selected, newly received high priority emails may be displayed, and details about the emails may be provided, such as a few lines of the email content and including rich media content of the email such as audio/visual content. The user may be able to navigate through emails presented in the headline view employing touch actions. For example the user may be enabled to swipe 512 to seamlessly browse and navigate to previous and/or subsequent emails on the interface, and additionally, the user may tap on navigation indicators such as forward and backward indicators 510 to navigate to a subsequent and/or previous email. Further, the user may be able to open 516 the email from the headline view in order to view the complete email.

Figure 6:
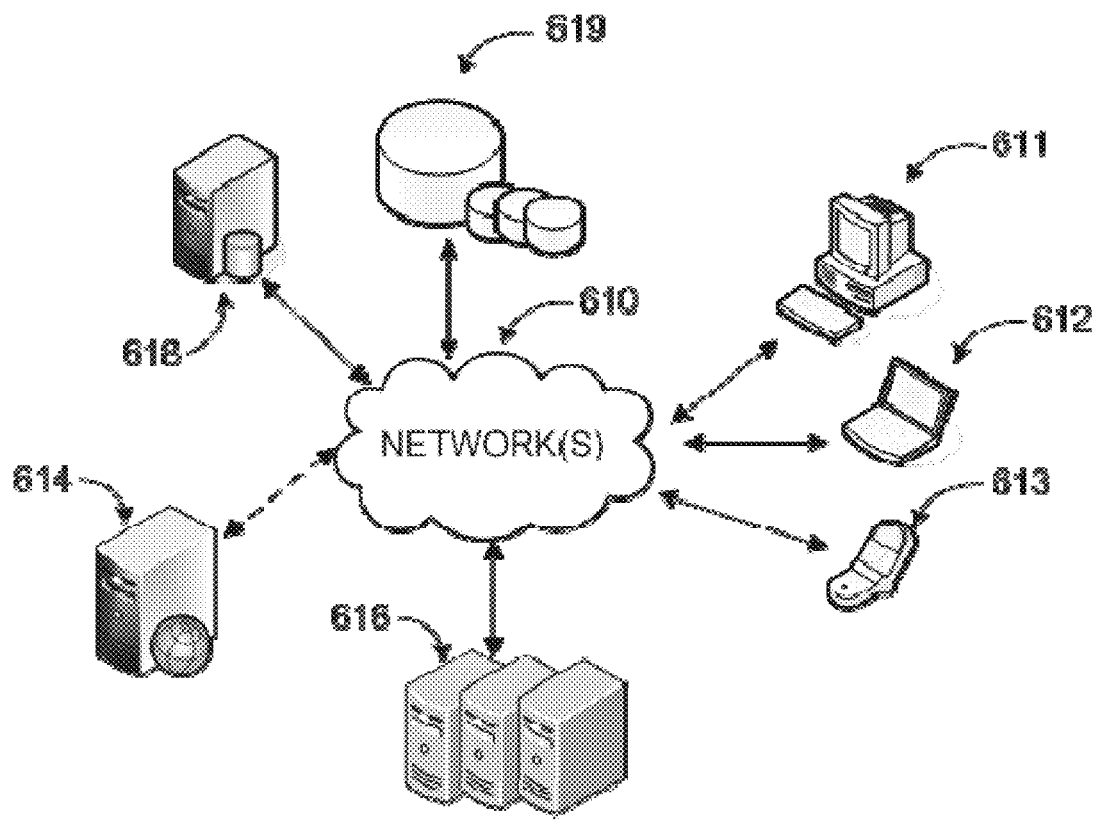
FIG. 6 is a networked environment, where a system according to embodiments may be implemented.

FIG. 6 is an example networked environment, where embodiments may be implemented. A system providing an email assistant for sorting and managing emails in an email application may be implemented via software executed over one or more servers 614 such as a hosted service. The platform may communicate with client applications on individual computing devices such as a smart phone 613, a laptop computer 612, or desktop computer 611 ('client device') through network(s) 610.

Client applications executed on any of the client devices 611-813 may facilitate communications via application(s) executed by servers 814, or on individual server 816. An email application executed on one of the servers may facilitate email exchange and provide efficient management of received emails as discussed previously. The email application may retrieve relevant data from data store(s) 819 directly or through database server 818, and provide requested services (e.g. document editing) to the user(s) through client devices 611-613.

Network(s) 610 may comprise any topology of servers, clients, Internet service providers, and communication media. A system according to embodiments may have a static or dynamic topology. Network(s) 610 may include secure networks such as an enterprise network, an unsecure network such as a wireless open network, or the Internet. Network(s) 610 may also coordinate communication over other networks such as Public Switched Telephone Network (PSTN) or cellular networks. Furthermore, network(s) 610 may include short range wireless networks such as Bluetooth or similar ones. Network(s) 610 provide communication between the nodes described herein. By way of example, and not limitation, network(s) 610 may include wireless media such as acoustic, RF, infrared and other wireless media.

Many other configurations of computing devices, applications, data sources, and data distribution systems may be employed to implement a platform providing an email assistant for efficient management of emails. Furthermore, the networked environments discussed in FIG. 6 are for illustration purposes only. Embodiments are not limited to the example applications, modules, or processes.

Figure 7:
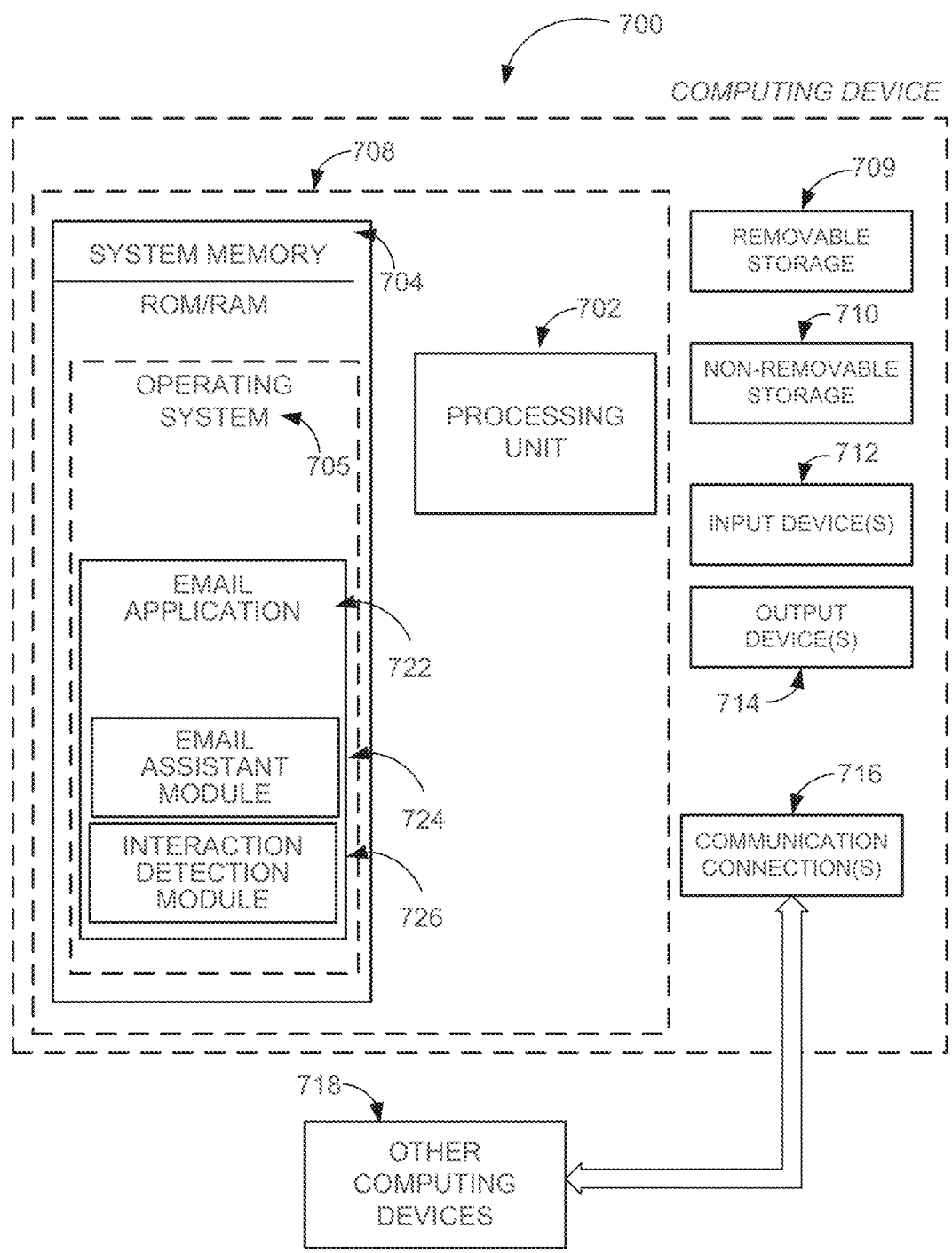
FIG. 7 is a block diagram of an example computing operating environment, where embodiments may be implemented.

FIG. 7 and the associated discussion are intended to provide a brief, general description of a suitable computing environment in which embodiments may be implemented. With reference to FIG. 7, a block diagram of an example computing operating environment for an application according to embodiments is illustrated, such as computing device 700. In a basic configuration, computing device 700 may be any portable computing device with wireless communication capabilities, which may include touch and/or gesture detection capability in some examples, and include at least one processing unit 702 and system memory 704. Computing device 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of the platform, such as the WINDOWS®, WINDOWS MOBILE®, or WINDOWS PHONE® operating systems from MICROSOFT CORPORATION of Redmond, Wash. The system memory 704 may also include one or more software applications such as email application 722, an email assistant module 724, and an interaction detection module 726.

Email application 722 may facilitate email exchange while email assistant module 724 prioritizes received emails for managing and sorting through the emails. The email assistant module 724 may determine based on feedback from interaction detection module 726 how to group, what actions to suggest, or what actions to perform on the received emails as discussed previously. Email application 722, email assistant module 724, and interaction detection module 726 may be separate applications or integrated modules of a hosted service. For example, email application 722 may be a browser accessing an email service. This basic configuration is illustrated in FIG. 7 by those components within dashed line 708.

Computing device 700 may have additional features or functionality. For example, the computing device 700 may also include additional data storage devices (removable and/or non-removable) such as, for example, magnetic disks, optical disks, or tape. Such additional storage is illustrated in FIG. 7 by removable storage 709 and non-removable storage 710. Computer readable storage media may include volatile and nonvolatile, removable and non-removable media implemented in any method or technology for storage of information, such as computer readable instructions, data structures, program modules, or other data. System memory 704, removable storage 709 and non-removable storage 710 are all examples of computer readable storage media. Computer readable storage media includes, but is not limited to, RAM. ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer readable storage media may be part of computing device 700. Computing device 700 may also have input device(s) 712 such as keyboard, mouse, pen, voice input device, touch input device, an optical capture device for detecting gestures, and comparable input devices. Output device(s) 714 such as a display, speakers, printer, and other types of output devices may also be included. These devices are well known in the art and need not be discussed at length here.

Some embodiments may be implemented in a computing device that includes a communication module, a memory device, and a processor, where the processor executes a method as described above or comparable ones in conjunction with instructions stored in the memory device. Other embodiments may be implemented as a computer readable memory device with instructions stored thereon for executing a method as described above or similar ones. Examples of memory devices as various implementations of hardware are discussed above.

Computing device 700 may also contain communication connections 716 that allow the device to communicate with other devices 718, such as over a wired or wireless network in a distributed computing environment, a satellite link, a cellular link, a short range network, and comparable mechanisms. Other devices 718 may include computer device(s) that execute communication applications, web servers, and comparable devices. Communication connection(s) 716 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 8:
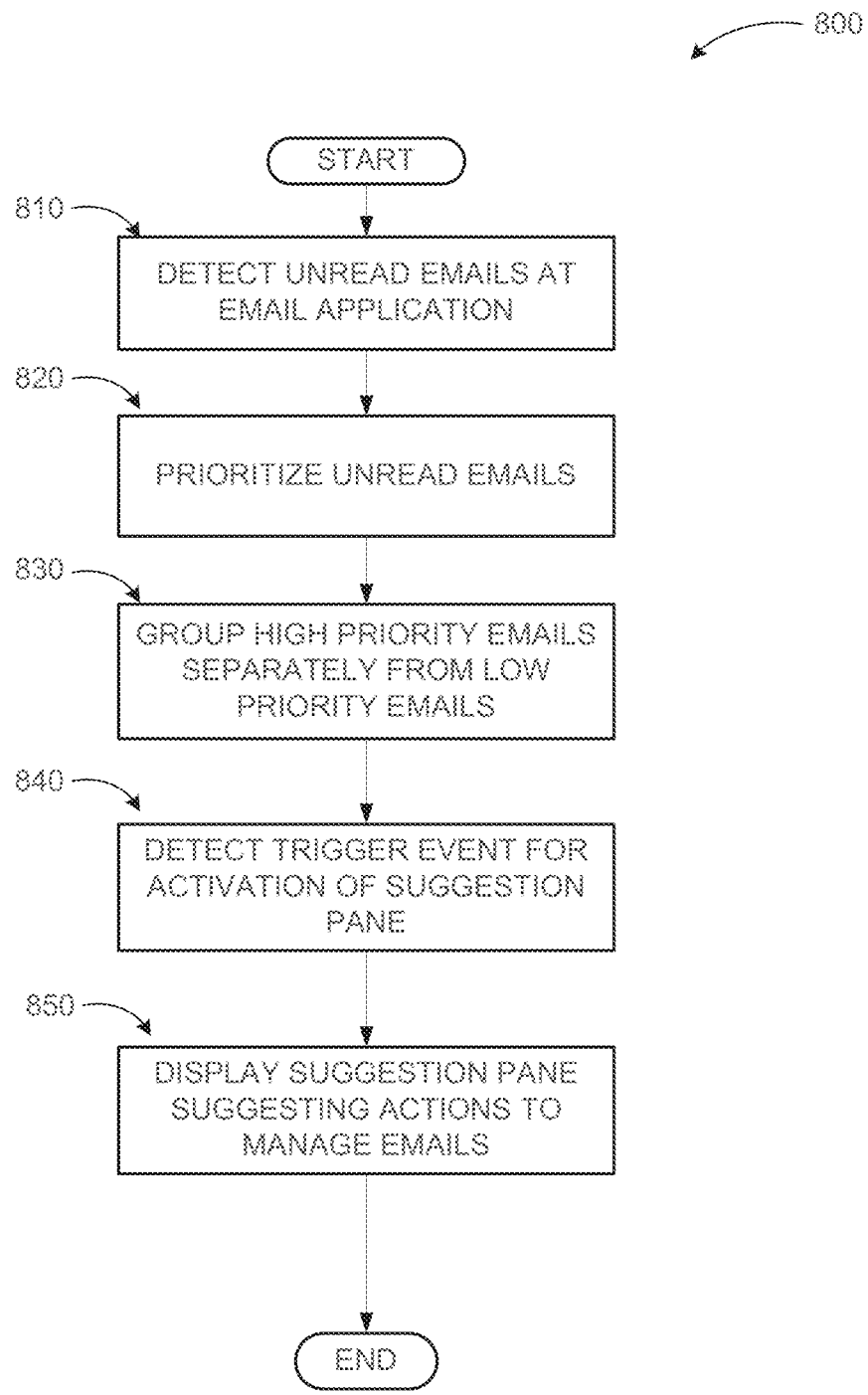
FIG. 8 illustrates a logic flow diagram for a process of providing an email assistant for sorting and managing emails in an email application according to embodiments.

FIG. 8 illustrates a logic flow diagram for a process of providing an email assistant for sorting and managing emails in an email application according to embodiments. Process 800 may be implemented on a server or other computing device.

Process 800 begins with operation 810, where a plurality of unread emails may be detected at an email application executed on a client device. Operation 810 may be followed by operation 820 where the unread emails may be prioritized. The emails may be prioritized based on observed user interactions with previous emails to identify emails as high and low priority. At operation 830, the emails identified as high priority may be grouped together and the emails identified as low priority may be grouped together in a low priority folder. The low priority folder may be displayed separately on the user interface as a separate designated section on the interface. Additionally, the separate folders may be added to a toolbar on the email application and may be displayed upon selection of the folder from the toolbar.

At operation 840, a trigger event may be detected to activate a suggestion pane. A trigger event may include detecting a large number of unread emails at the email application, detecting a user's return after a period of time away, such as on vacation or out of the office for an extended period of time, presence detection, such as an online and active status, at predefined times during a day, and upon manual activation by the user. Operation 840 may be followed by operation 850 where a suggestion pane may be displayed to provide a number of suggested actions for managing and sorting the groups of high priority emails and low priority emails.

The operations included in process 800 are for illustration purposes. Providing an email assistant for sorting and managing emails in an email application may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed in a computing device for providing an email assistant for sorting and managing emails, the method comprising:
    detecting the emails received through an email application;
    analyzing a pattern of user interactions with the emails;
    identifying a category associated with the emails as one or more of a personal category and a work category, wherein each category is associated with a priority;
    assigning the emails into two or more groups based on the analysis of the pattern of the user interactions and based on the priority associated with the identified category;
    detecting a presence status of the user; and
    automatically displaying a suggestion pane on an email application interface of the email application for managing folders containing the two or more groups of emails when the detected presence status of the user changes from a state of idleness to a state of activity.

2. The method of claim 1, further comprising:
    determining a number of groups based on the analysis of the pattern of the user interactions.

3. The method of claim 1, wherein assigning the emails into the two or more groups comprises:
    determining characteristics associated with a first email, wherein the characteristics include one or more of a sender, a subject, and a domain name of the sender;
    identifying a second email, wherein the second email shares one or more of the characteristics associated with the first email, and
    detecting a user action associated with the second email, wherein the user action includes one or more of deleting the second email, ignoring the second email, delaying a response to the second email, flagging the second email, saving the second email, and replying to the second email.

4. The method of claim 1, wherein the two or more groups include a first group of the emails that are associated with a first priority and a second group of email that are associated with a second priority, and wherein the first priority is greater than the second priority.

5. The method of claim 4, further comprising:
    displaying a first folder that contains the second group of the emails having the second priority in a separate section from a second folder that contains the first group of the emails having the first priority on the email application interface, wherein the first folder of the second priority emails hides the second priority emails from view.

6. The method of claim 5, further comprising:
    in response to detecting an activation of a displayed expansion control, expanding the first folder to display the hidden second group of the emails.

7. The method of claim 4, further comprising:
    displaying a first folder containing the second group of the emails having the second priority and a second folder containing the first group of the emails having the first priority in separate sections presented on a toolbar of the email application interface; and
    in response to receiving a selection one of the first folder and the second folder on the toolbar, displaying a list of the emails included in the selected one of the first and second folders.

8. The method of claim 7, further comprising:
    in response to detecting an activation of a control for a bulk action displayed on the email interface associated with the first folder, deleting the second group of emails included in the first folder.

9. The method of claim 7, further comprising:
    enabling a user to move a selected email from the first folder to the second folder.

10. A computing device for providing an email assistant for sorting and managing emails, the computing device comprising:
    a memory;
    a display; and
    a processing unit coupled to the memory and the display, the processing unit configured to provide an email application interface associated with an email application, wherein the email application is configured to:
    detect the emails received through the email application;
    analyze a pattern of user interactions with the emails;
    identify a category associated with the emails as one or more of a personal category and a work category, wherein each category is associated with a priority;
    determine a number of groups for the emails and assign the emails into two or more groups based on the analysis of the pattern of the user interactions and based on the priority associated with the identified category;

detect a presence status of the user; and automatically display a suggestion pane on the email application interface for managing folders containing the two or more groups of emails when the detected presence status of the user changes from a state of idleness to a state of activity.

11. The computing device of claim 10, wherein the email application is further configured to:

perform the suggested action automatically based on the analysis of the pattern of the user interactions.

12. The computing device of claim 10, wherein the email application is further configured to:

display a control for the suggested action on each of the emails listed within a folder.

13. The computing device of claim 10, wherein the email application is further configured to:

provide a control for the bulk action associated with at least one of the folders on the suggestion pane; and in response to a user activation of the control for the bulk action, display a confirmation of the bulk action.

14. The computing device of claim 10, wherein the email application is further configured to enable the user interactions with the email application interface through one or more of: a touch input, a keyboard input, a mouse input, a pen input, a voice command, and an eye-tracking input.

15. The computing device of claim 10, wherein the email application is one of a hosted service accessed through a browser executed on the computing device and a locally installed application executed on the computing device.

16. A computer-readable memory device with instructions stored thereon for providing an email assistant for sorting and managing emails, the instructions comprising:

detecting the emails received through an email application;

analyzing a pattern of user interactions with the emails;

identifying a category associated with the emails as one or more of a personal category and a work category, wherein each category is associated with a priority;

determining a number of groups and assigning the emails into two or more groups based on the analysis of the pattern of the user interactions and based on a priority associated with the identified category;

detect a presence status of the user; and automatically display a suggestion pane on a client device used for viewing the email application for managing folders containing the two or more groups of emails when the detected presence status of the user changes from a state of idleness to a state of activity.

17. The computer-readable memory device of claim 16, wherein the instructions further comprise:

displaying different viewing and sorting suggestions based on the client device used for viewing the email application interface of the email application.

18. The computer-readable memory device of claim 17, wherein the instructions further comprise:

activating the email assistant at predefined times configurable by the user.

* * * * *